US011444307B2

United States Patent
Toyoda et al.

(10) Patent No.: US 11,444,307 B2
(45) Date of Patent: Sep. 13, 2022

(54) MANUFACTURING METHOD FOR FUEL CELL INCLUDING A STEP OF PREPARING A SHELF DEVICE

(71) Applicant: TOYOTA JIDOSHA KABUSHIKI KAISHA, Toyota (JP)

(72) Inventors: Keiji Toyoda, Susono (JP); Katsumi Sato, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/065,902

(22) Filed: Oct. 8, 2020

(65) Prior Publication Data
US 2021/0194033 A1    Jun. 24, 2021

(30) Foreign Application Priority Data

Dec. 19, 2019    (JP) .............................. JP2019-229374

(51) Int. Cl.
*H01M 8/2404*    (2016.01)
*H01M 8/242*    (2016.01)

(52) U.S. Cl.
CPC .......... *H01M 8/2404* (2016.02); *H01M 8/242* (2013.01); *Y02P 70/50* (2015.11)

(58) Field of Classification Search
CPC ....... H01M 8/2404; H01M 2008/1095; H01M 8/242; Y02P 70/50
See application file for complete search history.

(56) References Cited

U.S. PATENT DOCUMENTS

2016/0365598 A1* 12/2016 Ju ....................... H01M 8/2404

FOREIGN PATENT DOCUMENTS

| CN | 110021772 | * | 7/2019 | .......... H01M 8/2404 |
| JP | 2010-212139 A | | 9/2010 | |
| KR | 20170132599 A | * | 12/2017 | .............. H01M 8/00 |

OTHER PUBLICATIONS

Machine translation of CN 110021772, Sheng et al., 2019 (Year: 2019).*
Machine translation of KR 20170132599A, Park et al., 2017 (Year: 2017).*

* cited by examiner

*Primary Examiner* — Kwang Han
(74) *Attorney, Agent, or Firm* — Hunton Andrews Kurth LLP (57) ABSTRACT

A shelf device including a plurality of shelves is prepared. A quadrangular plate-shaped cell unit can be placed on each of the selves. A plurality of cell units is placed such that the cell units are disposed on respective shelves. The cell unit is disposed on the shelf such that the second part is placed between the recessed portions. The cell units are disposed on the shelves such that corresponding recessed portions of the cell units overlap each other. A pair of jigs extending in a first direction is placed such that the jigs are disposed inside the recessed portions of the cell units. The shelf device is caused to retreat from the cell units and the jigs, and relative positions of the cell units are changed along the jigs so that the cell units make contact with each other.

2 Claims, 10 Drawing Sheets

MANUFACTURING METHOD FOR FUEL CELL INCLUDING A STEP OF PREPARING A SHELF DEVICE

CROSS-REFERENCE TO RELATED APPLICATION

This application claims priority to Japanese Patent Application No. 2019-229374 filed on Dec. 19, 2019, incorporated herein by reference in its entirety.

BACKGROUND

1. Technical Field

This disclosure relates to a manufacturing method for a fuel cell.

2. Description of Related Art

In the related art, there is a technology to laminate cells by use of a lamination jig (Japanese Unexamined Patent Application Publication No. 2010-212139 (JP 2010-212139 A)). In the technology of JP 2010-212139 A, the lamination jig includes a base plate and a guide bar extending in the normal direction of the base plate. In the technology of JP 2010-212139 A, by means of a mounting unit, a plurality of cells is mounted along the guide bar from an open end of the guide bar such that the normal direction of the base plate and the normal direction of the cells are set along the same direction, and thus, the cells mounted on the lamination jig are aligned in parallel to the base plate and are maintained in a laminated state.

SUMMARY

However, in the above technology, it is necessary to mount the cells repeatedly by accurately positioning each of the cells relative to the guide bar. This requires time to manufacture a laminated body of the cells. The inventors of the present disclosure examined such a technique that, at the time of mounting the cells, their positions are roughly determined, and after that, the cells are aligned. However, in such a process, a sealing portion provided in each of the cells such that the sealing portion projects from a surface of the each of the cells might be distorted and damaged.

This disclosure is achievable in the following aspects.

(1) One aspect of this disclosure provides a manufacturing method for a fuel cell. The manufacturing method includes: (a) a step of preparing a shelf device including a plurality of shelves arranged along a first direction, each of the shelves being configured such that a plate-shaped cell unit having a generally quadrangular outer shape is placed on the each of the shelves in a direction perpendicular to the first direction, the cell unit including a pair of recessed portions provided such that the recessed portions are disposed in respective sides as a pair of sides facing each other in the generally quadrangular outer shape, the each of the shelves including a first part fixed relative to other shelves, and a second part projecting from the first part in a second direction perpendicular to the first direction, the second part having a width smaller than a distance between the recessed portions of the cell unit in a third direction perpendicular to the first direction and the second direction; (b) a step of placing a plurality of cell units such that the cell units are disposed on respective shelves, each of the cell units being disposed on a corresponding one of the shelves such that the second part is placed between the recessed portions in the third direction when the each of the cell units is viewed along the first direction, the cell units disposed on the respective shelves being disposed on the respective shelves such that corresponding recessed portions of the cell units overlap each other; (c) a step of disposing a pair of jigs extending in the first direction such that the jigs are disposed inside the recessed portions of the cell units; and (d) a step of moving the shelf device from the cell units and the jigs in a reverse direction to the second direction and then changing relative positions of the cell units along the jigs disposed inside the recessed portions so that the cell units make contact with each other.

With such a configuration, when a plurality of cell units is placed, it is not necessary to accurately position the cell units one by one. On this account, in comparison with a configuration in which a plurality of cell units is mounted by accurately positioning the cell units one by one, it is possible to shorten time necessary for manufacture.

(2) In the manufacturing method according to the above aspect, each of the cell units may include, on a first surface, a separator in which a sealing portion configured to seal fluid between the each of the cell units and an adjacent cell unit is not disposed in a projecting manner in a thickness direction of the each of the cell units, and also include, on a second surface, a separator in which the sealing portion is disposed in a projecting manner in the thickness direction. The step of placing the cell units such that the cell units are disposed on the respective shelves may be a step of placing the each of the cell units on a corresponding one of the shelves so that the separator disposed on the first surface is supported by the corresponding one of the shelves.

With such a configuration, the cell units can be laminated without damaging the sealing portions when the shelf device is moved.

(3) In the manufacturing method according to the above aspect, the first part may include a positioning portion extending in the first direction and disposed at a first position placed in the reverse direction to the second direction relative to a region where the cell unit is to be disposed, and a positioning portion extending in the first direction and disposed at either one or both of a second position and a third position, the second position being placed in the third direction relative to the region where the cell unit is to be disposed, the third position being placed in a reverse direction to the third direction relative to the region where the cell unit is to be disposed. The step of placing the cell units such that the cell units are disposed on the respective shelves may be a step of placing the cell units such that the cell units are disposed on the respective shelves in a state where the cell units are brought into contact with the positioning portion disposed at the first position and the positioning portion disposed at either one or both of the second position and the third position.

With such a configuration, it is possible to easily perform an operation of accurately disposing the cell unit in each shelf. On this account, in comparison with a configuration that does not include the positioning portions, it is possible to shorten time necessary for manufacture.

This disclosure is achievable in various forms other than the manufacturing method. For example, the disclosure can be achieved in the forms of a fuel cell, a computer program to implement the manufacturing method, a non-transitory recording medium in which the computer program is stored, and so on.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

A. Embodiment

The following describes a manufacturing method for a fuel cell according to the present embodiment. A fuel cell stack to be manufactured in the present embodiment includes a plurality of power generation cell units 100 laminated on each other.

Figure 1:
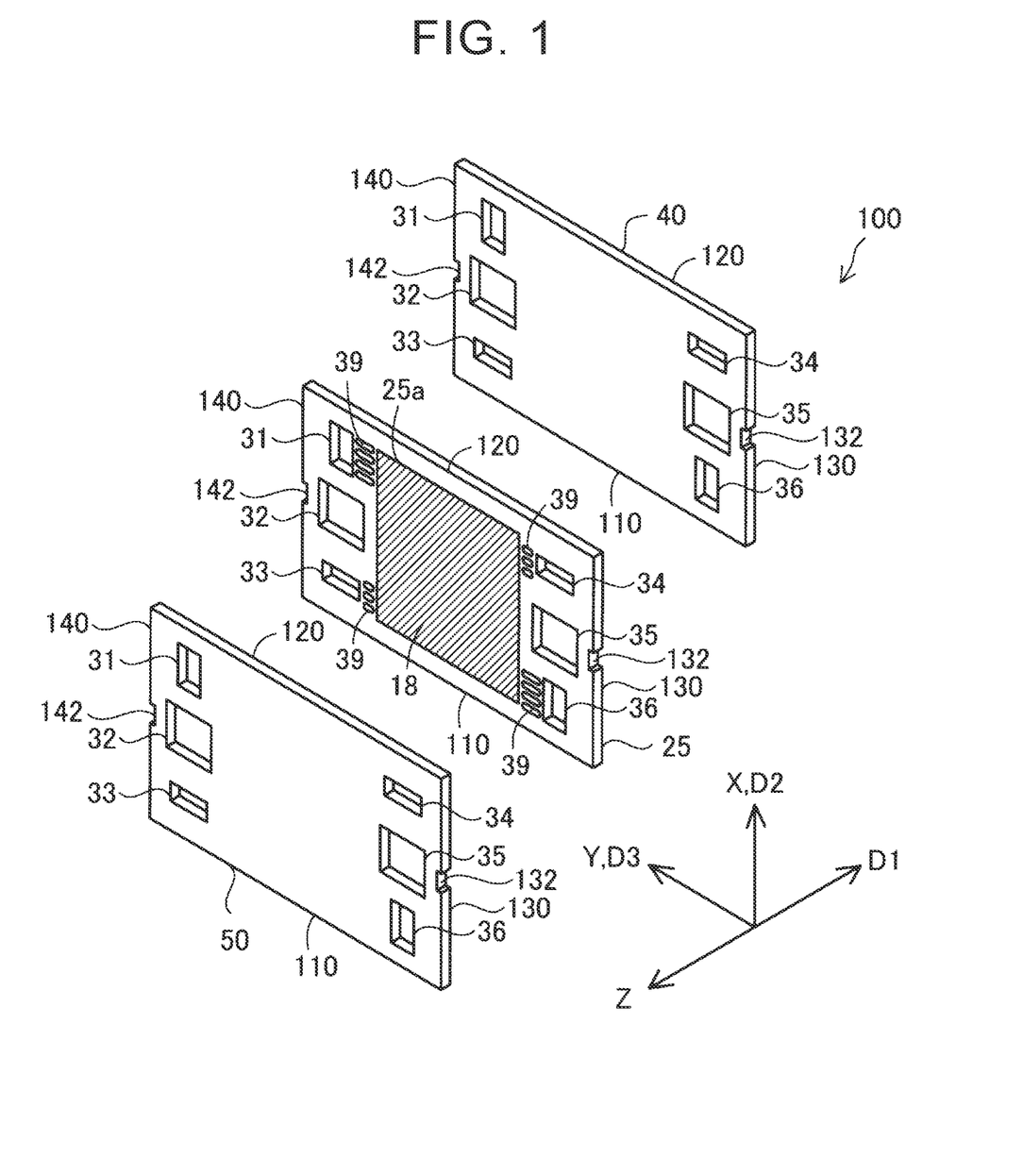
FIG. 1 is an exploded perspective view schematically illustrating a schematic configuration of a power generation cell unit 100.

FIG. 1 is an exploded perspective view schematically illustrating a schematic configuration of the power generation cell unit 100. In order to facilitate understanding of the technology, an X-axis, a Y-axis, and a Z-axis perpendicular to each other are illustrated in FIG. 1. In the present specification, a Z-axis negative direction is also referred to as a first direction D1. An X-axis positive direction is also referred to as a second direction D2. A Y-axis positive direction is also referred to as a third direction D3. Note that FIG. 1 schematically illustrates each part in a fuel cell of the present embodiment and does not accurately illustrate the dimension of each part.

The power generation cell unit 100 is a unit including an anode and a cathode and configured to generate electric power upon receipt of fuel gas and oxidation gas. The power generation cell unit 100 has a plate-shaped structure having a generally quadrangular outer shape including sides 110, 120, 130, 140. More specifically, the power generation cell unit 100 has a generally rectangular outer shape. The power generation cell unit 100 includes a pair of recessed portions 132, 142 provided such that the recessed portions 132, 142 are disposed in the sides 130, 140 as a pair of sides facing each other in the generally rectangular outer shape. More specifically, the recessed portions 132, 142 are provided at the same position in the second direction D2, namely, the X-direction. The recessed portions 132, 142 will be described later.

In the present specification, that the plate-shaped structure "has a generally quadrangular outer shape" means that the following conditions are satisfied. That is, a quadrangle with a minimum area is defined to an outer shape obtained when the plate-shaped structure is projected on a horizontal plane parallel to the plate, such that the minimum area can include the outer shape. In a case where the percentage of the area of the outer shape of the plate-shaped structure to the area of the quadrangle is 90% or more, the plate-shaped structure is considered to "have a generally quadrangular outer shape." Note that the quadrangle may be a trapezoid, a parallelogram, or a quadrangle that does not have parallel sides.

Further, "a pair of recessed portions provided such that the recessed portions are disposed in respective sides as a pair of sides facing each other in a generally quadrangular outer shape" means that, among four sides of the quadrangle defined in the above process, two sides closest to the recessed portions are sides facing each other.

The power generation cell unit 100 includes a membrane electrode gas diffusion layer assembly (MEGA) 18, separators 40, 50, and a first resin frame 25.

The MEGA 18 includes a membrane electrode assembly (MEA) and a pair of gas diffusion layers. The MEA includes an electrolyte membrane and catalyst electrode layers formed on the opposite surfaces of the electrolyte membrane. The gas diffusion layers are disposed on the opposite sides of the MEA.

The first resin frame 25 surrounds an outer peripheral portion of the MEGA 18 so as to hold the MEA. The outer shape of the first resin frame 25 is a rectangular frame shape. The MEGA 18 is joined to the first resin frame 25 such that the MEA covers an opening 25a in the center of the first resin frame 25. A structure in which the MEGA 18 is joined to the first resin frame 25 is also referred to as a "first frame joining body."

The separators 40, 50 are disposed on the opposite sides of the first frame joining body. The separators 40, 50 are rectangular plate-shaped members. The separators 40, 50 are each made of a conductive member through which oxidation gas and fuel gas of the fuel cell do not pass.

An inside-cell fuel gas passage through which fuel gas flows is formed between the MEGA 18 and the separator 40. An inside-cell oxidation gas passage through which oxidation gas flows is formed between the MEGA 18 and the separator 50.

In a part near an outer periphery of each of the separators 40, 50 and the first resin frame 25, manifold holes 31 to 36 to form manifolds are provided at respective positions where the manifold holes 31 to 36 of the separators 40, 50 and the first resin frame 25 overlap each other in the laminating direction of the fuel cell stack. The manifold holes 31 form an oxidation gas supply manifold. The manifold holes 32 form a refrigerant supply manifold. The manifold holes 33 form a fuel gas discharge manifold. The manifold holes 34 form a fuel gas supply manifold. The manifold holes 35 form a refrigerant discharge manifold. The manifold holes 36 form an oxidation gas discharge manifold.

The first resin frame 25 is provided with slit portions 39 as illustrated in FIG. 1. The slit portions 39 form communicating passages via which the manifold holes 31, 33, 34, 36 communicate with their corresponding inside-cell gas passages. The slit portions 39 adjacent to the manifold holes 33, 34 allow respective fuel gas manifolds constituted by the manifold holes 33, 34 to communicate with the inside-cell fuel gas passage. The slit portions 39 adjacent to the manifold holes 31, 36 allow respective oxidation gas manifolds constituted by the manifold holes 31, 36 to communicate with the inside-cell oxidation gas passage.

Figure 2:
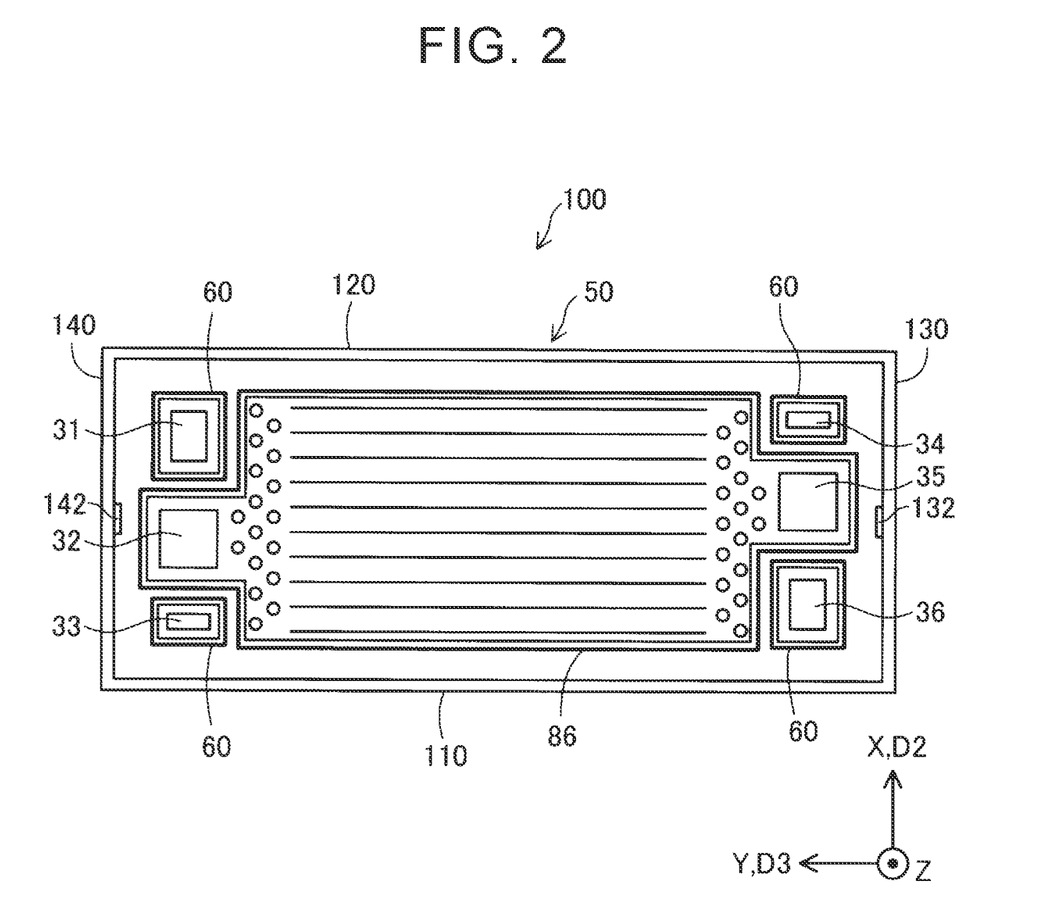
FIG. 2 is a plan view of the power generation cell unit 100 viewed along a Z-axis negative direction.

FIG. 2 is a plan view of the power generation cell unit 100 viewed along the Z-axis negative direction. Gaskets 60, 86 are provided on the separator 50. The gaskets 60, 86 have a function to seal a passage formed between the separator 50 of one of two power generation cell units 100 and the separator 40 of the other one of the two power generation cell units 100, the two power generation cell units 100 being adjacent to each other when the power generation cell units 100 are laminated. More specifically, the gasket 86 seals refrigerant manifolds constituted by the manifold holes 32, 35 and an inter-cell refrigerant passage from their outside. The gaskets 60 seal respective gas manifolds constituted by the manifold holes 31, 33, 34, 36 between the cells from their outside. That is, the gaskets 60, 86 function as sealing portions configured to seal fluid between adjacent power generation cell units. The gaskets 60, 86 are each constituted by an elastic body. The elastic body to be used is, for example, rubber or thermoplastic elastomer.

No gasket 60, 86 is formed in the separator 40. That is, the plate-shaped power generation cell unit 100 includes the separator 40 on a first surface, the separator 40 being configured such that the gaskets 60, 86 as the sealing portions are not disposed in a projecting manner in the thickness direction of the power generation cell unit 100, namely, a Z-axis positive direction or the Z-axis negative direction. Further, the power generation cell unit 100 includes the separator 50 on a second surface (see FIG. 1), the separator 50 being configured such that the gaskets 60, 86 as the sealing portions are disposed in a projecting manner in the Z-axis positive direction. When the gaskets 60, 86 of the separator 50 facing the separator 40 are pressed against a surface of the separator 40, respective passages are sealed.

Figure 3:
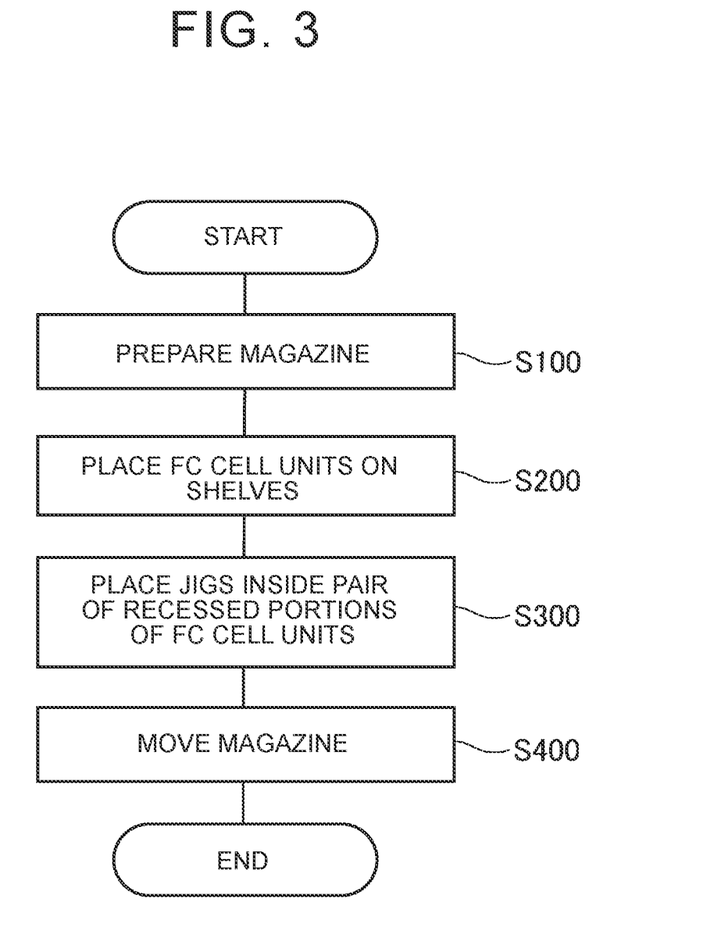
FIG. 3 is a flowchart illustrating a process of a manufacturing method for a fuel cell in the present embodiment.

FIG. 3 is a flowchart illustrating a process of the manufacturing method for the fuel cell in the present embodiment. In step S100, a magazine 200 is prepared.

Figure 4:
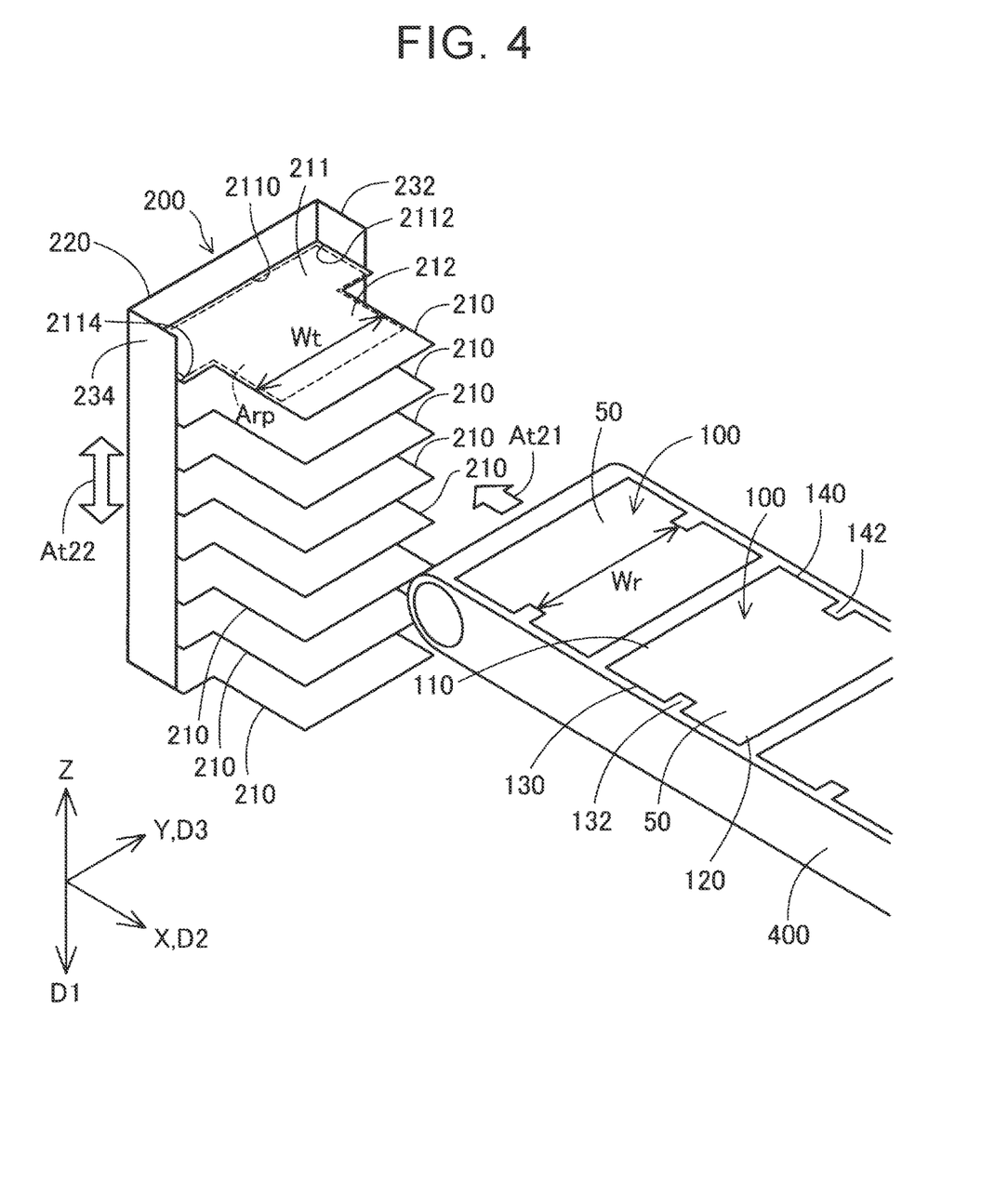
FIG. 4 is an explanatory view illustrating processes of steps S100, S200.

FIG. 4 is an explanatory view illustrating processes of steps S100, S200. FIG. 4 is a schematic perspective view illustrating the magazine 200 and a belt conveyor 400. The magazine 200 includes a plurality of shelves 210, a connecting portion 220, a first positioning portion 232, and a second positioning portion 234.

The connecting portion 220 is a generally quadrangular plate-shaped member extending along the first direction D1 and the third direction D3. The shelves 210 are connected to the connecting portion 220 in a posture perpendicular to the first direction D1. The shelves 210 are arranged side by side in the first direction D1. The shelves 210 are arranged at regular intervals in the first direction D1. The generally quadrangular plate-shaped power generation cell unit 100 can be placed on each of the shelves 210 in a direction perpendicular to the first direction D1.

Each of the shelves 210 includes a first part 211 and a second part 212. The first part 211 is fixed to the connecting portion 220. As a result, the first part 211 is fixed relative to the other shelves 210.

In the first part 211, the plate-shaped connecting portion 220 is disposed at a first position 2110 placed in a reverse direction to the second direction D2, that is, in an X-axis negative direction relative to a region Arp where the power generation cell unit 100 should be disposed. In the first part 211, the first positioning portion 232 is disposed at a second position 2112 placed in the third direction D3, that is, in the Y-axis positive direction relative to the region Arp where the power generation cell unit 100 should be disposed. In the first part 211, the second positioning portion 234 is disposed at a third position 2114 placed in a reverse direction to the third direction D3, that is, in a Y-axis negative direction relative to the region Arp where the power generation cell unit 100 should be disposed. The connecting portion 220, the first positioning portion 232, and the second positioning portion 234 extend in the first direction D1 and accordingly have such a function to position the power generation cell unit 100 in the shelf 210, as will be described later.

The second part 212 is provided to project from the first part 211 in the second direction D2, that is, the X-axis positive direction. The second part 212 has a width Wt smaller than a distance Wr between the recessed portions 132, 142 of each of the power generation cell units 100 in the third direction D3, that is, the Y-axis positive direction. Note that the distance Wr between the recessed portions 132, 142 is the length of a shortest line segment among line segments each connecting a given part of the recessed portion 132 to a given part of the recessed portion 142. The width of the second part 212 in the third direction D3 is smaller than the width of the first part 211.

Figure 5:
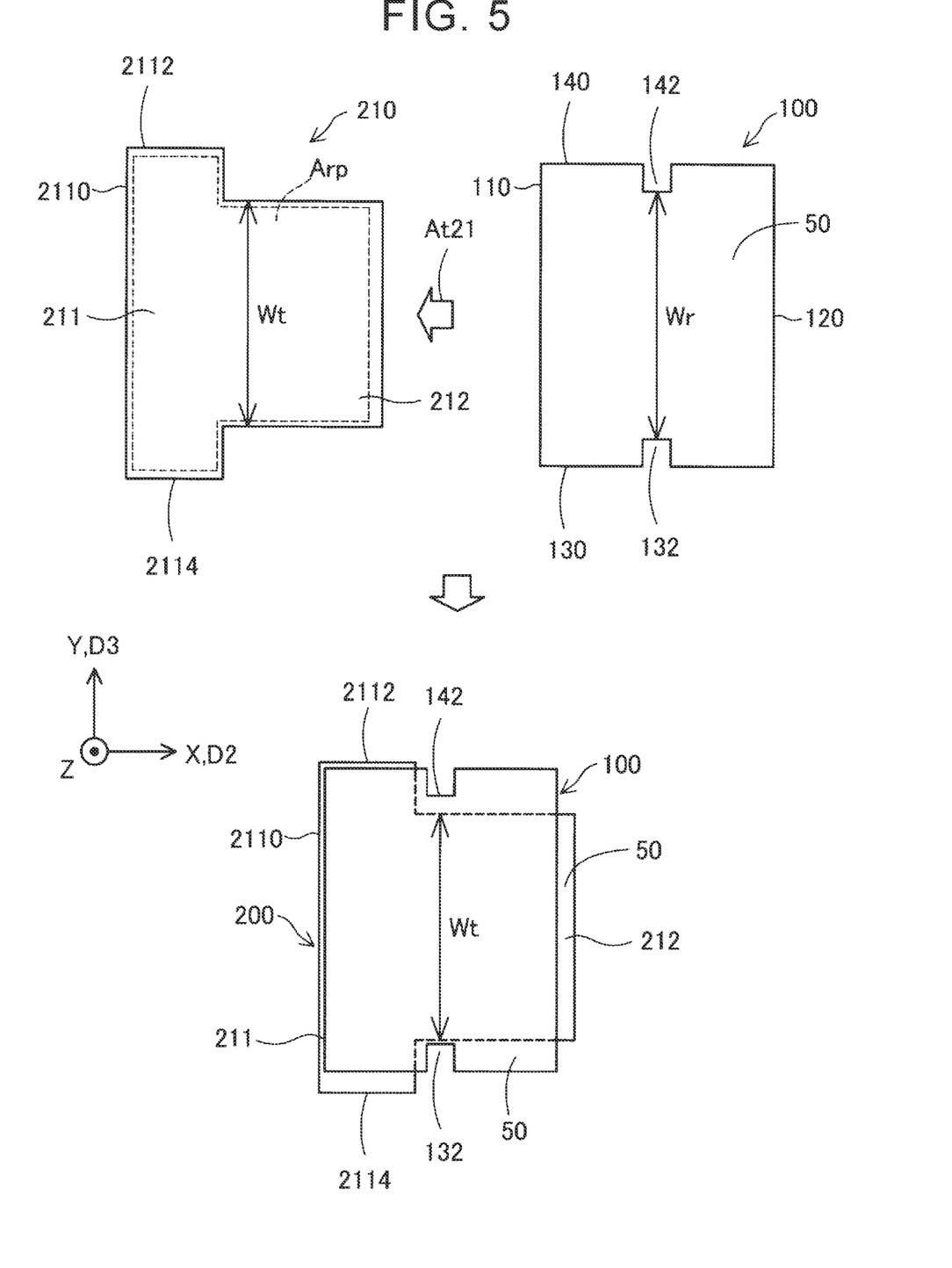
FIG. 5 is an explanatory view illustrating the process of step S200.

FIG. 5 is an explanatory view illustrating a process of step S200. FIG. 5 illustrates the power generation cell unit 100 and the shelf 210 viewed along the first direction D1.

In step S200 in FIG. 3, the power generation cell units 100 are placed on respective shelves 210. More specifically, the power generation cell units 100 arranged on the belt conveyor 400 and conveyed by the belt conveyor 400 are sequentially placed on the respective shelves 210 of the magazine 200 (see an arrow At21 in FIGS. 4 and 5). When one power generation cell unit 100 is placed on the shelf 210, the magazine 200 moves in the Z-axis positive direction just by the dimension of the distance between the shelf 210 and the shelf 210 (see an arrow At22 in FIG. 4).

In step S200, the power generation cell units 100 are placed on the respective shelves 210 so that the separators 40 each including no projecting seal are supported by the respective shelves 210. In other words, the power generation cell units 100 are placed on the respective shelves 210 such that the separators 50 each including the gaskets 60, 86 disposed in a projecting manner face upward.

By performing such a process, the power generation cell units 100 can be laminated without damaging the gaskets 60, 86 of the separator 50 when the magazine 200 is moved in a process of subsequent step S400.

In step S200, the power generation cell units 100 are disposed on the shelves 210 in a state where the power generation cell units 100 make contact with the connecting portion 220 in the second direction D2. The power generation cell units 100 are disposed on the shelves 210 in a state where the power generation cell units 100 make contact with the first positioning portion 232 in the third direction D3 (see the lower part of FIG. 5). Such a process is performable, for example, such that the power generation cell unit 100 is disposed on the shelf 210 by sliding the power generation cell unit 100 over an inclined surface connecting the belt conveyor 400 to the shelf 210. The inclined surface inclines downward along the Y-axis positive direction and also inclines downward along the X-axis negative direction.

By performing such a process, it is possible to easily perform an operation of accurately disposing the power generation cell units 100 on the respective shelves 210. On this account, in comparison with a configuration that does not include the connecting portion 220 and the first positioning portion 232, it is possible to shorten time necessary for manufacture. Note that, in FIG. 5, in order to facilitate understanding of the technology, a gap is provided between the first position 2110 where the connecting portion 220 is disposed and the power generation cell unit 100, and a gap is also provided between the second position 2112 where the first positioning portion 232 is disposed and the power generation cell unit 100.

In step S200, the power generation cell unit 100 is disposed on the shelf 210 such that the second part 212 of the shelf 210 is placed between the recessed portions 132, 142 of the power generation cell unit 100 in the third direction D3 (see the lower part of FIG. 5). Further, the power generation cell units 100 disposed on the shelves 210 are disposed on the shelves 210 such that their corresponding recessed portions 132, 142 overlap each other when the power generation cell units 100 are projected in the first direction D1 (see the lower part of FIG. 5).

Note that, in the present specification, that "a constituent A and a constituent B overlap each other when they are projected in a given direction" means that the constituent A and the constituent B at least partially overlap each other when they are projected in the given direction.

Figure 6:
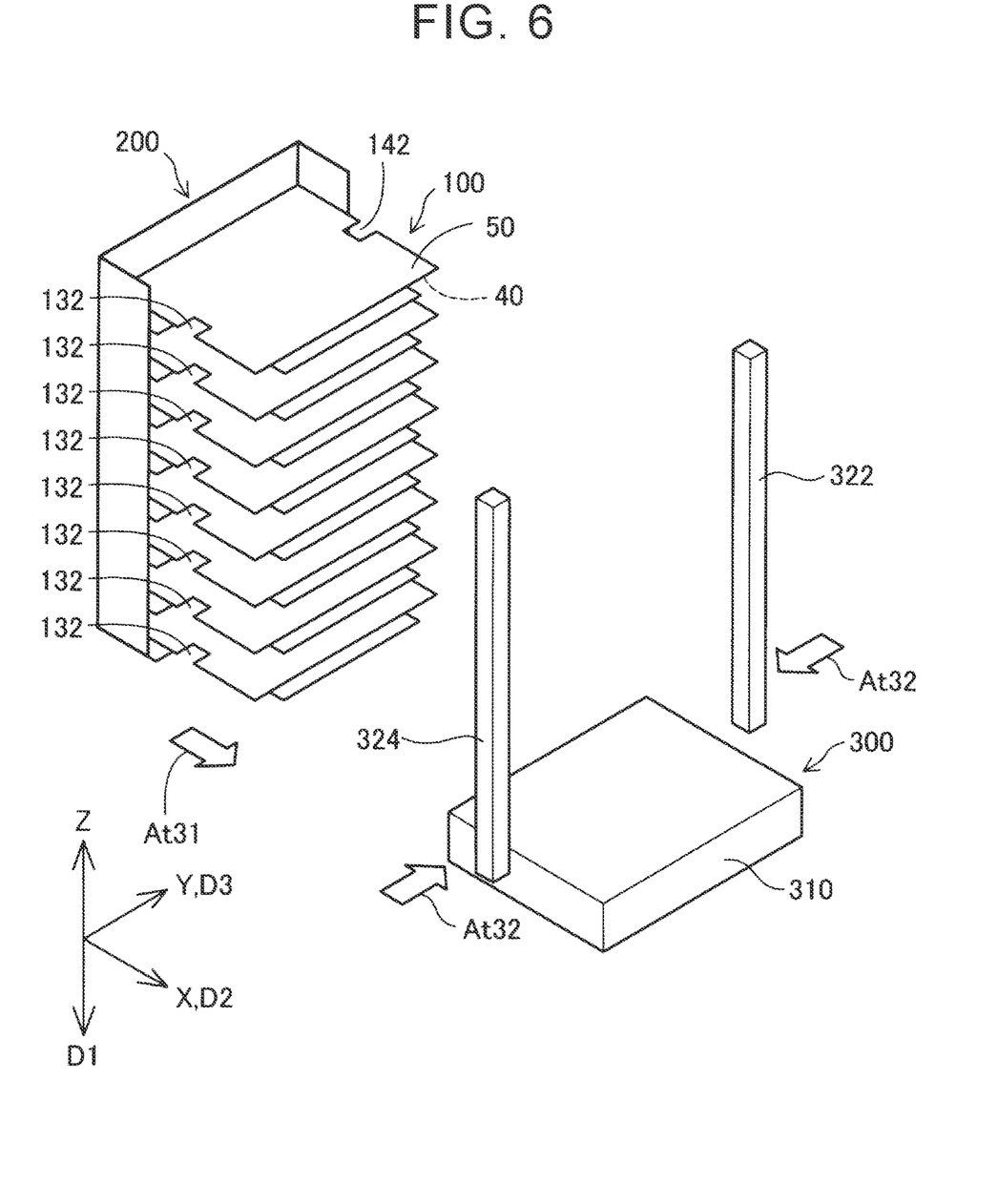
FIG. 6 is an explanatory view illustrating a process of step S300.

FIG. 6 is an explanatory view illustrating a process of step S300. FIG. 6 is a schematic perspective view illustrating the magazine 200 and an alignment device 300. In step S300 in FIG. 3, the magazine 200 is moved on the alignment device 300 (see an arrow At31). The alignment device 300 includes a support base 310 and a pair of jigs 322, 324.

The support base 310 is a base for supporting the laminated power generation cell units 100. The jigs 322, 324 are bar-shaped jigs extending in the first direction D1. The jigs 322, 324 are jigs to be disposed inside the recessed portions 132, 142 of the power generation cell units 100 so as to align the power generation cell units 100. The jigs 322, 324 are configured to be movable in the Y-direction.

Figure 7:
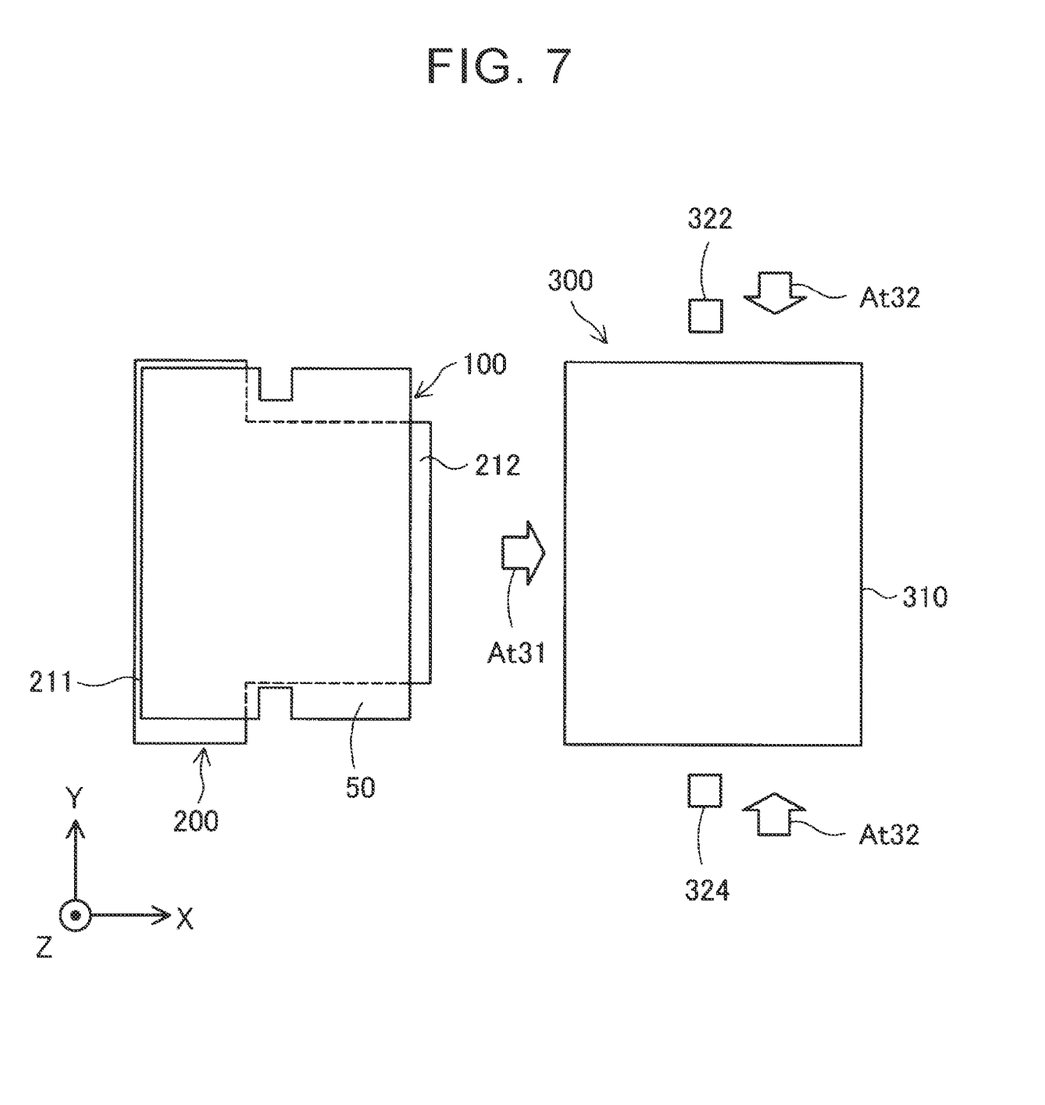
FIG. 7 is an explanatory view illustrating the process of step S300.

FIG. 7 is an explanatory view illustrating the process of step S300. FIG. 7 illustrates the magazine 200, the power generation cell unit 100, and the alignment device 300 viewed along the first direction D1. In step S300, the jigs 322, 324 are disposed inside the recessed portions 132, 142 of the power generation cell units 100 (see an arrow At32).

Figure 8:
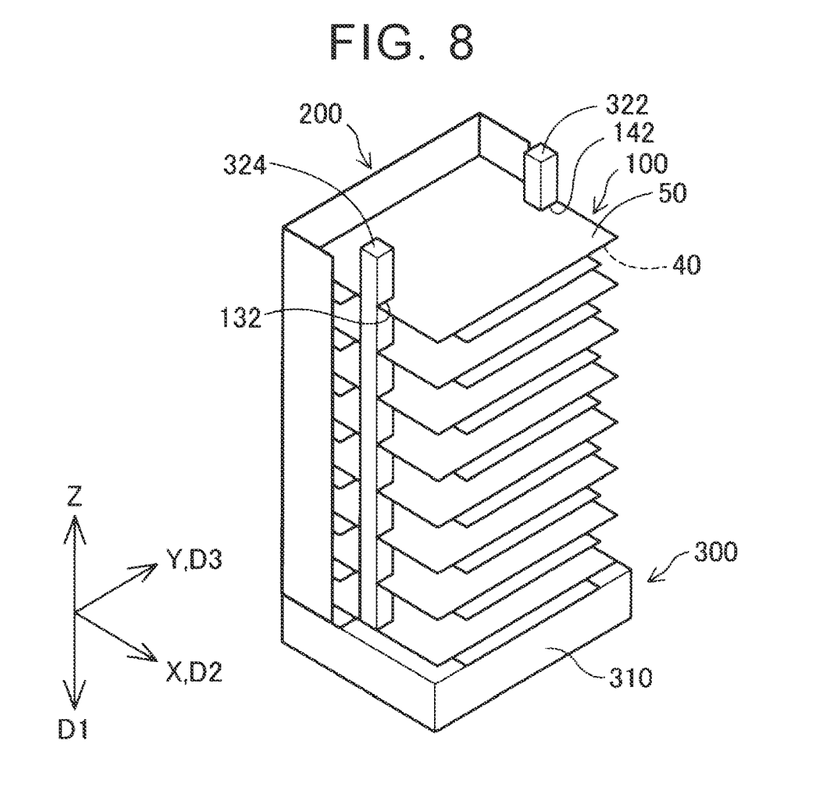
FIG. 8 is an explanatory view illustrating a state where the process of step S300 has been completed.

FIG. 8 is an explanatory view illustrating a state where the process of step S300 has been completed. FIG. 8 is a schematic perspective view illustrating the magazine 200 and the alignment device 300.

Figure 9:
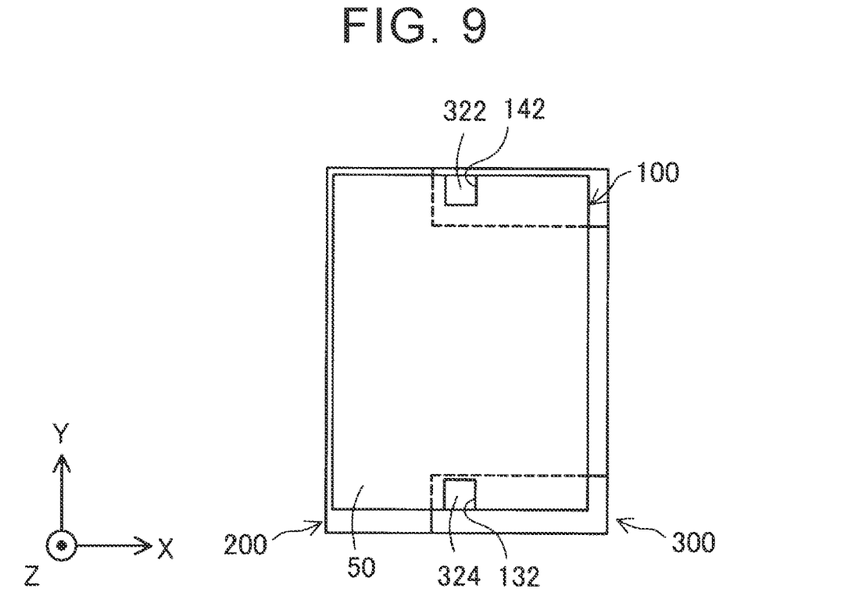
FIG. 9 is an explanatory view illustrating a state where the process of step S300 has been completed.

FIG. 9 is an explanatory view illustrating a state where the process of step S300 has been completed. FIG. 9 illustrates the magazine 200, the power generation cell unit 100, and the alignment device 300 viewed along the first direction D1. In FIGS. 8 and 9, the jigs 322, 324 are disposed inside the recessed portions 132, 142 of the power generation cell units 100, respectively.

Figure 10:
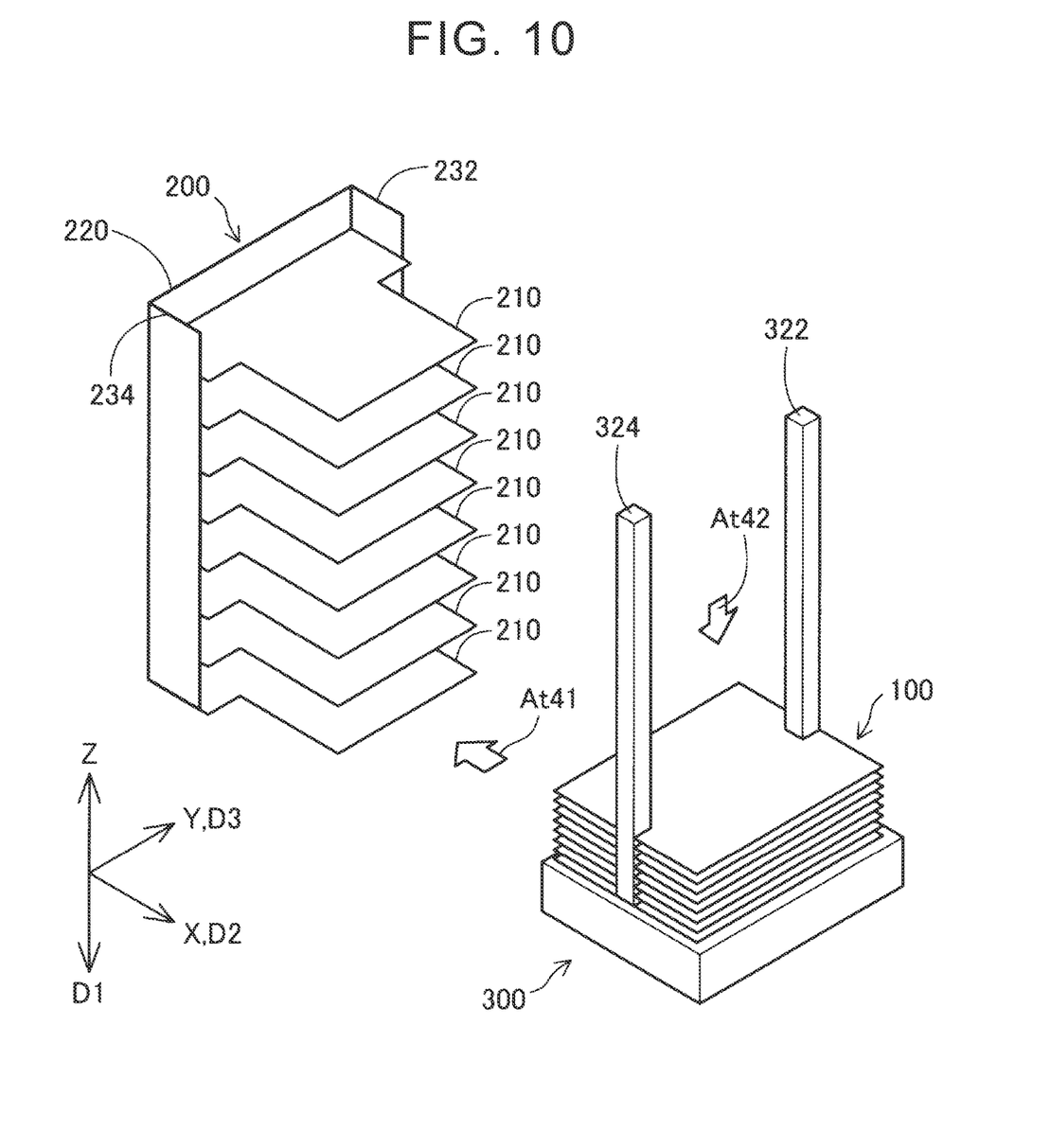
FIG. 10 is an explanatory view illustrating a process of step S400.

FIG. 10 is an explanatory view illustrating a process of step S400. FIG. 10 is a schematic perspective view illustrating the magazine 200 and the alignment device 300. In step S400 in FIG. 3, the magazine 200 is caused to retreat from the power generation cell units 100 and the jigs 322, 324. More specifically, the magazine 200 is moved from the power generation cell units 100 and the jigs 322, 324 in a reverse direction to the second direction D2, that is, in the X-axis negative direction (see an arrow At41).

Figure 11:
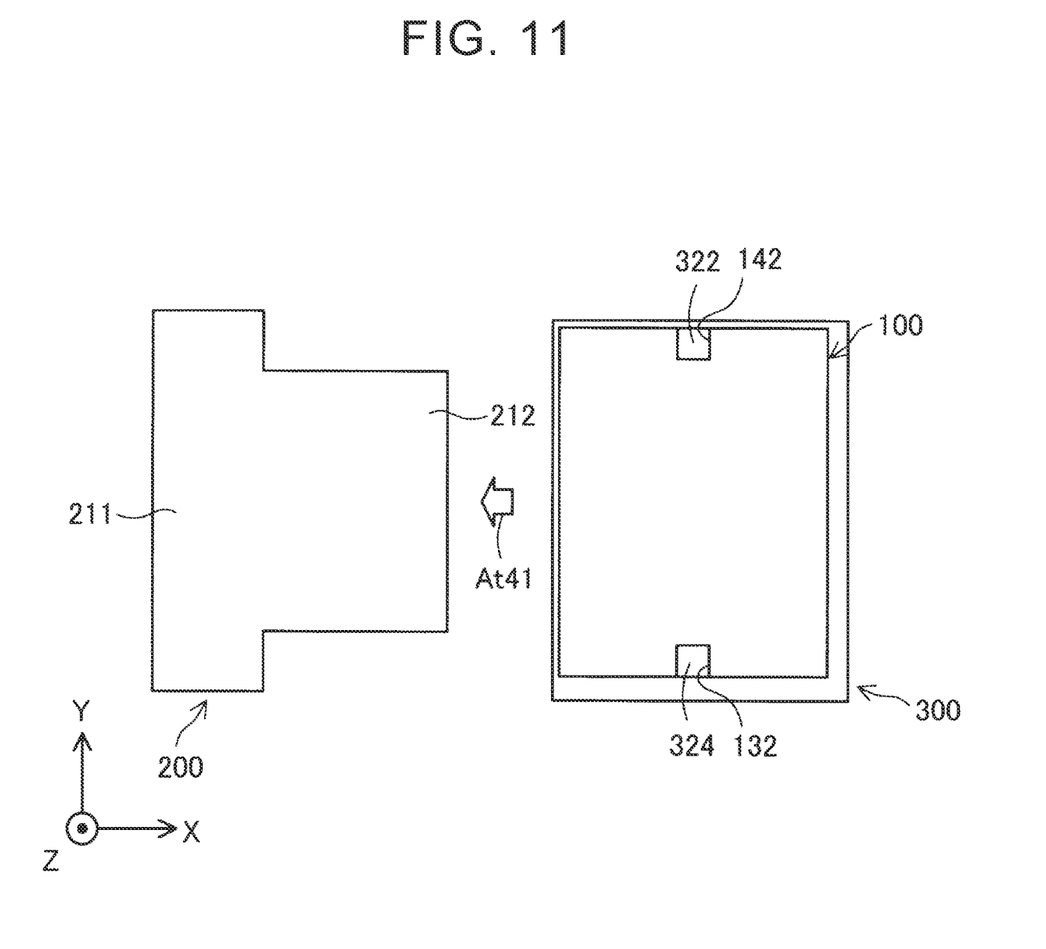
FIG. 11 is an explanatory view illustrating the process of step S400.

FIG. 11 is an explanatory view illustrating the process of step S400. FIG. 11 illustrates the magazine 200, the power generation cell unit 100, and the alignment device 300 viewed along the first direction D1. Since the movement of the recessed portions 132, 142 in the second direction D2 is restricted by the jigs 322, 324 of the alignment device 300, even when the magazine 200 moves, the power generation cell units 100 do not move in the X-axis negative direction. As a result, the power generation cell units 100 that lose support fall down in the Z-axis negative direction along the recessed portions 132, 142 (see an arrow At42). At this time, relative positions of the power generation cell units 100 change in the Z-axis direction along the jigs 322, 324 disposed inside the recessed portions 132, 142. After that, the power generation cell units 100 make contact with each other.

The power generation cell units 100 thus laminated are obtained as described above. After that, a pair of current collector plates and a pair of end plates are provided such that respective current collector plates and respective end plates are disposed in the opposite ends of a laminated body constituted by the power generation cell units 100, and thus, a fuel cell stack is formed.

By performing such a process, at the time when a lot of cell units are to be mounted in the manufacture of a fuel cell, it is not necessary to accurately position the power generation cell units 100 one by one. On this account, in comparison with a configuration in which a lot of power generation cell units 100 are mounted by accurately positioning the power generation cell units 100 one by one, it is possible to shorten time necessary for manufacture.

The magazine 200 in the present embodiment is also referred to as a "shelf device." The power generation cell unit 100 is also referred to as a "cell unit." The gaskets 60, 86 are also referred to as "sealing portions." The connecting portion 220, the first positioning portion 232, and the second positioning portion 234 are also referred to as "positioning portions." The fuel cell stack is also referred to as a "fuel cell."

B. Other Embodiments

B1. Another Embodiment 1

(1) In the above embodiment, the power generation cell unit 100 has a generally rectangular outer shape (see FIG. 2). However, the cell unit may have other shapes such as a generally parallelogram, a generally trapezoid, a generally diamond, and a shape similar to a quadrangular shape that does not have sides parallel to each other. Further, the cell unit may have a polygonal shape other than a quadrangle, a circle, or a shape having a part projecting inwardly. Note that it is preferable that the cell unit have an outer shape the outline shape of which is a generally quadrangle.

(2) In the above embodiment, the power generation cell unit 100 includes the MEGA 18, the separators 40, 50, and the first resin frame 25 (see FIG. 1). However, the cell unit may be a unit including two or more MEGAS. In such a cell unit, one separator may be disposed between the MEGAS adjacent to each other, or two or more separators may be disposed between the MEGAS adjacent to each other.

(3) In the above embodiment, the recessed portions 132, 142 are provided at the same position in the second direction D2, namely, the X-direction (see FIG. 2). However, the recessed portions may be provided at different positions in the second direction D2. Note that it is preferable that each recessed portion have a shape including a directional component in the third direction D3, and the each recessed portion be recessed toward a side facing the side where the each recessed portion is provided, out of the sides where respective recessed portions are provided.

(4) In the above embodiment, the power generation cell unit 100 includes the recessed portions 132, 142 (see FIG. 2). However, the cell unit may further include another recessed portion. In the manufacturing process of the fuel cell, a jig extending in the first direction D1 may be disposed for such another recessed portion similarly to the recessed portions 132, 142, or such a jig may not be disposed.

(5) In the above embodiment, the width Wt of the second part 212 of the shelf 210 of the magazine 200 is smaller than the width of the first part 211 (see the left side in the upper part of FIG. 5). However, the width of the first part of the shelf may be equal to the width of the second part or may be smaller than the width of the second part.

(6) In the above embodiment, the jigs 322, 324 are bar-shaped jigs extending in the first direction D1 (see FIGS. 6 and 8). However, a direction where the jigs to be inserted into the recessed portions extend may include a component in a direction other than the first direction D1. However, it is preferable that a part, of each of the jigs, that makes contact with the recessed portion extend along the first direction D1.

B2. Another Embodiment 2

In the above embodiment, the power generation cell unit 100 includes, on the first surface, the separator 40 that does not include a sealing portion disposed in a projecting manner, and the power generation cell unit 100 also includes, on the second surface, the separator 50 including the gaskets 60, 86 disposed in a projecting manner (see FIG. 1). Then, in step S200, the power generation cell units 100 are placed on respective shelves 210 so that the separators 40 provided with no projecting seal are supported by the respective shelves 210 (see the lower part of FIG. 5).

However, at the time when the power generation cell units are placed on respective shelves, some of or all of the cell units may be disposed on the respective shelves such that the separators on which the sealing portions are disposed in a projecting manner in the thickness direction are supported by the respective shelves. Further, the cell unit may include, on the opposite surfaces, separators on which sealing portions are disposed in a projecting manner.

B3. Another Embodiment 3

(1) In the above embodiment, in the shelf 210, the plate-shaped connecting portion 220 is disposed at the first position 2110 placed in the X-axis negative direction relative to the region Arp where the power generation cell unit 100 should be disposed (see FIG. 4). The first positioning portion 232 is disposed at the second position 2112 placed in the Y-axis positive direction relative to the region Arp. The second positioning portion 234 is disposed at the third position 2114 placed in the Y-axis negative direction relative to the region Arp. The connecting portion 220, the first positioning portion 232, and the second positioning portion 234 have a function to position the power generation cell unit 100 in the shelf 210. However, the shelf device can have a configuration in which at least part of the constituents that have the positioning function is not disposed.

Even in such a configuration, the cell units can be aligned along the jig, provided that the cell units are disposed such that respective recessed portions of the cell units overlap each other to such an extent that the jigs extending in the first direction are inserted in the recessed portions.

(2) In the above embodiment, in step S200, the power generation cell units 100 are disposed on the shelves 210 in a state where the power generation cell units 100 make contact with the connecting portion 220 in the second direction D2. The power generation cell units 100 are disposed on the shelves 210 in a state where the power generation cell units 100 make contact with the first positioning portion 232 in the third direction D3 (see the lower part of FIG. 5). However, for example, the power generation cell units 100 may be disposed on the shelves 210 in a state where the power generation cell units 100 make contact with the second positioning portion 234 in the third direction D3 instead of making contact with the first positioning portion 232. It is preferable that the cell units be disposed on the shelves in a state that two adjacent sides of the generally quadrangular shape of the cell units make contact with the positioning portions. With such a configuration, it is possible to easily perform an operation of accurately disposing the cell units on the shelves.

The disclosure is not limited to the above embodiments and is achievable in various configurations within a range that does not deviate from the gist of the disclosure. For example, technical features of the embodiments, corresponding to the technical features of the aspects described in SUMMARY, can be replaced or combined appropriately, in order to solve some or all of the problems described above or in order to achieve some or all of the above effects. Further, the technical features can be deleted appropriately if the technical features have not been described as essential in the present specification.

What is claimed is:

1. A manufacturing method for a fuel cell, the manufacturing method comprising:
   (a) a step of preparing a shelf device including a plurality of shelves arranged along a first direction, each of the shelves being configured such that a plate-shaped cell unit having a generally quadrangular outer shape is placed on the each of the shelves in a direction perpendicular to the first direction, the cell unit including a pair of recessed portions provided such that the recessed portions are disposed in respective sides as a pair of sides facing each other in the generally quadrangular outer shape, the each of the shelves including a first part fixed relative to other shelves, and a second part projecting from the first part in a second direction perpendicular to the first direction, the second part having a width smaller than a distance between the recessed portions of the cell unit in a third direction perpendicular to the first direction and the second direction;
   (b) a step of placing a plurality of cell units such that the cell units are disposed on respective shelves, each of the cell units being disposed on a corresponding one of the shelves such that the second part is placed between the recessed portions in the third direction when the each of the cell units is viewed along the first direction, the cell units disposed on the respective shelves being disposed on the respective shelves such that corresponding recessed portions of the cell units overlap each other;
   (c) a step of disposing a pair of jigs extending in the first direction such that the jigs are disposed inside the recessed portions of the cell units, the jigs being configured to be movable in the third direction; and
   (d) a step of moving the shelf device from the cell units and the jigs in a reverse direction to the second direction and then changing relative positions of the cell units along the jigs disposed inside the recessed portions so that the cell units make contact with each other, wherein
   each of the cell units includes, on a first surface of the each of the cell units, a separator in which a linear elastic gasket is not disposed, and also includes, on a second surface of the each of the cell units, a separator in which the linear elastic gasket is disposed in a projecting manner in a thickness direction of the each of the cell units, the linear elastic gasket being configured to seal fluid between the each of the cell units; and the step of placing the cell units such that the cell units are disposed on the respective shelves is a step of placing the each of the cell units on a corresponding one of the shelves so that the separator disposed on the first surface is supported by the corresponding one of the shelves, and the separator disposed on the second surface is not supported by the corresponding one of the shelves.

2. The manufacturing method according to claim 1, wherein:
the first part includes
a positioning portion extending in the first direction and disposed at a first position placed in the reverse direction to the second direction relative to a region where the cell unit is to be disposed, and
a positioning portion extending in the first direction and disposed at either one or both of a second position and a third position, the second position being placed in the third direction relative to the region where the cell unit is to be disposed, the third position being placed in a reverse direction to the third direction relative to the region where the cell unit is to be disposed; and
the step of placing the cell units such that the cell units are disposed on the respective shelves is a step of placing the cell units such that the cell units are disposed on the respective shelves in a state where the cell units are brought into contact with the positioning portion disposed at the first position and the positioning portion disposed at either one or both of the second position and the third position.

\* \* \* \* \*